(12) United States Patent  
Tomikawa et al.

(10) Patent No.: US 9,261,664 B2  
(45) Date of Patent: Feb. 16, 2016

(54) OPTICAL FIBER CABLE

(71) Applicant: FUJIKURA LTD., Koto-ku, Toyko (JP)

(72) Inventors: Kouji Tomikawa, Katsushika-ku (JP); Naoki Okada, Yotsukaido (JP); Daiki Takeda, Yotsukaido (JP); Masayoshi Yamanaka, Yachiyo (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/453,088

(22) Filed: Aug. 6, 2014

(65) Prior Publication Data

US 2015/0286026 A1    Oct. 8, 2015

Related U.S. Application Data

(63) Continuation of application No. PCT/JP2013/051126, filed on Jan. 22, 2013.

(30) Foreign Application Priority Data

Feb. 16, 2012    (JP) ................................. 2012-031837

(51) Int. Cl.
- *G02B 6/44* (2006.01)
- *H01B 3/30* (2006.01)
- *H01B 3/44* (2006.01)
- *H01B 7/295* (2006.01)
- *H01B 7/288* (2006.01)

(52) U.S. Cl.  
CPC .............. *G02B 6/443* (2013.01); *G02B 6/4494* (2013.01); *H01B 7/288* (2013.01)

(58) Field of Classification Search  
CPC ............................... G02B 6/4494; H01B 7/288  
USPC ............................... 385/100, 112; 174/110 R  
See application file for complete search history.

(56) References Cited

U.S. PATENT DOCUMENTS 3,803,339 A * 4/1974 Speekman ........... H01B 13/221  
    106/33  
4,812,014 A * 3/1989 Sawano ................ G01M 3/165  
    250/227.14

(Continued)

FOREIGN PATENT DOCUMENTS

EP    0378940 A1 * 12/1989 ............... H01B 7/28  
JP    62-049114 U    3/1987

(Continued)

OTHER PUBLICATIONS

International Search Report for PCT/JP2013/051126 dated Apr. 16, 2013.

(Continued)

*Primary Examiner* — Robert Tavlykaev  
(74) *Attorney, Agent, or Firm* — Sughrue Mion, PLLC

(57) ABSTRACT

There is provided an optical fiber cable having a configuration in which a strand core of optical fibers is housed in a sheath and capable of fulfilling sufficient mechanical characteristics and ensuring a predetermined watertight property. The optical fiber cable includes a strand core 1 including a plurality of optical fiber strands 11 and watertight material strings 12, a tape body 2 covering the strand core 1, and a cylindrical sheath 5 covering the strand core 1 and the tape body 2, wherein the tape body 2 has water permeability, and the watertight material strings 12 are dissolved in water when the water permeates through the tape body 2, and the dissolved watertight material passes through the tape body 2 and flows into the sheath 5.

4 Claims, 4 Drawing Sheets

(56) References Cited

U.S. PATENT DOCUMENTS

| | | | | |
|---|---|---|---|---|
| 5,481,635 A | * | 1/1996 | Arroyo | H01B 11/1891 385/103 |
| 6,184,473 B1 | * | 2/2001 | Reece | H01B 7/2825 174/110 R |
| 7,751,666 B2 | * | 7/2010 | Parsons | G02B 6/4494 385/100 |
| 2003/0188879 A1 | * | 10/2003 | Easter | H01B 7/288 174/23 R |

FOREIGN PATENT DOCUMENTS

| | | | | |
|---|---|---|---|---|
| JP | 63-073209 A | | 4/1988 | |
| JP | 09-113402 A | | 5/1997 | |
| JP | 9-237526 | * | 9/1997 | H01B 7/28 |
| JP | 2001-083382 A | | 3/2001 | |
| JP | 2001-343565 A | | 12/2001 | |
| JP | 2006-171697 A | | 6/2006 | |
| JP | 2008-076897 A | | 4/2008 | |
| JP | 2008-076898 A | | 4/2008 | |
| JP | 2008156833 A | | 7/2008 | |
| JP | 2009-086637 A | | 4/2009 | |

OTHER PUBLICATIONS

Written Opinion for PCT/JP2013/051126 dated Apr. 16, 2013.
Communication dated Oct. 6, 2015 from the Japanese Patent Office in counterpart application No. 2012-031837.

* cited by examiner (a)

(b)

OPTICAL FIBER CABLE

CROSS-REFERENCE TO RELATED APPLICATION

The application is a Continuation of PCT Application No. PCT/JP2013/051126, filed on Jan. 22, 2013, and claims the benefit of priority from the prior Japanese Patent Application No. 2012-031837, filed on Feb. 16, 2012, the entire contents of which are incorporated herein by reference.

BACKGROUND OF THE INVENTION

The present invention relates to an optical fiber cable including a strand core of optical fibers housed in a sheath, and particularly, relates to an optical fiber cable having an improved watertight property.

BACKGROUND ART

In general, optical fiber cables include slot cores having slot grooves housing optical fibers, and include sheaths covering circumferences of the slot cores.

Japanese Unexamined Patent Application Publication No. 2008-076897 (Patent Literature 1) and Japanese Unexamined Patent Application Publication No. 2008-076898 (Patent Literature 2) each describe an optical fiber cable having a reduced diameter and a structure with high density, as shown in FIG. 7, the optical fiber cable including a single-groove slot core (a C slot core) 103 having a single slot groove 102 housing a strand core 101 of optical fiber strands, and including a sheath 104 covering the circumference of the single-groove slot core 103. The slot groove 102 of the single-groove slot core 103 is a groove formed linearly and having an opening on one side of the single-groove slot core 103. The optical fiber cable has an eccentric sheath structure in which the sheath 104 has a thickness which is thickest at a portion facing the opening of the slot groove 102.

In order to satisfy mechanical characteristics in the optical fiber cable, the circumference of the strand core 101 including the optical fiber strands is covered with a tape body 105.

Here, the optical fiber cable configured as described above is required to ensure a predetermined watertight property. In other words, such an optical fiber cable is required, if water permeates into the sheath from one side, to prevent the water from flowing towards the other side.

The optical fiber cable including the single-groove slot core 103, however, may have difficulty in ensuring a predetermined watertight property. In particular, in order to ensure a predetermined watertight property, the optical fiber cable may have a configuration in which a watertight material is included inside the tape body 105 together with the strand core 101. However, a phenomenon that water flows into a gap between the single-groove slot core 103 and the tape body 105 may occur even if the watertight material is included inside the tape body 105, which prevents the optical fiber cable from ensuring a sufficient watertight property.

SUMMARY

The present invention has been made in view of the above-described circumstances. An object of the present invention is to provide an optical fiber cable having a configuration in which a strand core of optical fibers is housed in a sheath and capable of fulfilling sufficient mechanical characteristics and ensuring a predetermined watertight property.

In order to solve the problem described above and achieve the object of the present invention, the optical fiber cable according to the present invention has any one of the following configurations.

Configuration 1

The optical fiber cable includes: a strand core including a plurality of optical fiber strands and watertight material strings; a tape body extending in a cable longitudinal direction and covering the strand core; and a cylindrical sheath covering the strand core and the tape body, wherein the tape body has water permeability, and the watertight material strings are dissolved in water when the water permeates through the tape body, and a dissolved watertight material passes through the tape body and flows into the sheath.

Configuration 2

In the optical fiber cable having Configuration 1, the water permeability of the tape body is ensured due to a plurality of openings formed on the tape body.

Configuration 3

In the optical fiber cable having Configuration 1, the water permeability of the tape body is ensured due to a porous material composing the tape body.

Configuration 4

In the optical fiber cable having Configuration 1, the water permeability of the tape body is ensured in a manner such that a circumference of the strand core is not entirely covered with the tape body, but part of the circumference of the strand core is exposed to an outside.

In the optical fiber cable having Configuration 1, the tape body has water permeability, and the watertight material strings are dissolved in water when the water permeates through the tape body, and the dissolved watertight material passes through the tape body and flows into the sheath. As a result, even if the water is present in gaps around the tape body, the flowing watertight material absorbs the water and is then solidified or swollen so as to stop the flow of the water.

The optical fiber cable can ensure the water permeability of the tape body due to a plurality of openings formed on the tape body, as described in Configuration 2.

The optical fiber cable can ensure the water permeability of the tape body due to a porous material composing the tape body, as described in Configuration 3.

The optical fiber cable can ensure the water permeability of the tape body in a manner such that the circumference of the strand core is not entirely covered with the tape body, but part of the circumference of the strand core is exposed to the outside, as described in Configuration 4.

Namely, the present invention can provide an optical fiber cable having a configuration in which a strand core of optical fibers is housed in a sheath and capable of fulfilling sufficient mechanical characteristics and ensuring a predetermined watertight property.

DESCRIPTION OF EMBODIMENTS

Hereinafter, embodiments according to the present invention will be explained in detail below with reference to the drawings.

First Embodiment

Figure 1:
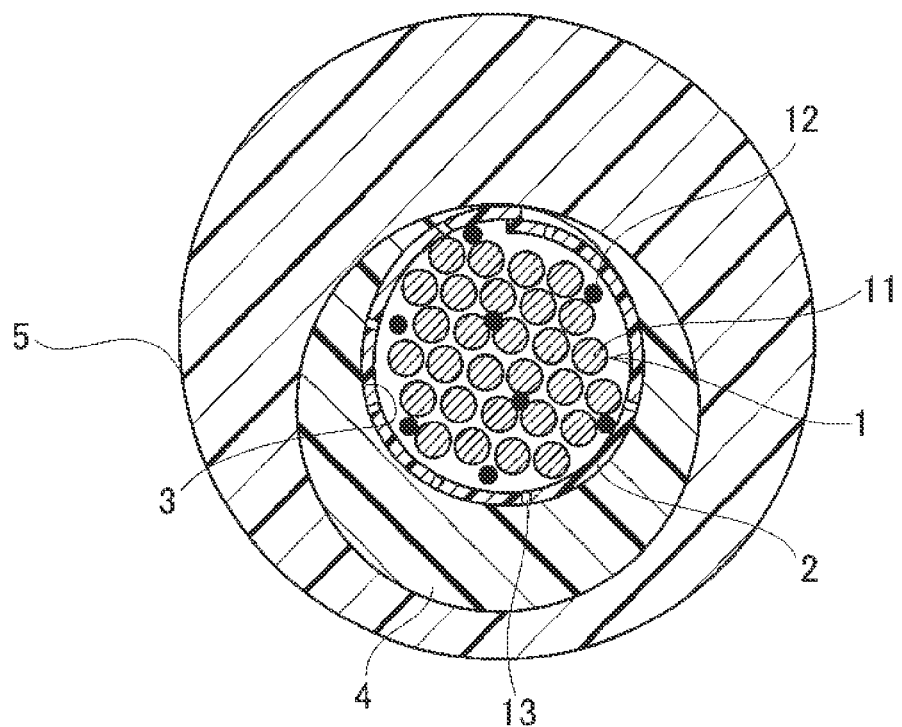
FIG. 1 is a cross-sectional view showing a configuration of an optical fiber cable according to a first embodiment of the present invention.

FIG. 1 is a cross-sectional view showing a configuration of an optical fiber cable according to a first embodiment of the present invention.

As shown in FIG. 1, the optical fiber cable according to the first embodiment of the present invention includes a strand core 1 including optical fiber strands 11, watertight material strings (water absorption yarn) 12 composing the strand core 1 together with the optical fiber strands 11, a tape body 2 extending in a cable longitudinal direction and covering the strand core 1, and a slot core 4 having a slot groove 3 formed linearly in the cable longitudinal direction.

The optical fiber strands 11 are obtained in a manner such that optical fibers are covered with ultraviolet curable resin. The plural optical fiber strands 11 may be arranged in parallel and covered with ultraviolet curable resin to compose an optical fiber ribbon. In addition, the optical fiber ribbon may be an intermittently-fixed ribbon obtained in a manner such that the optical fiber strands 11 are intermittently attached and fixed together at predetermined intervals in the cable longitudinal direction. According to the present embodiment, the strand core 1 including the plural optical fiber strands 11 is covered with the tape body 2 and housed in the slot groove 3.

Figure 2:
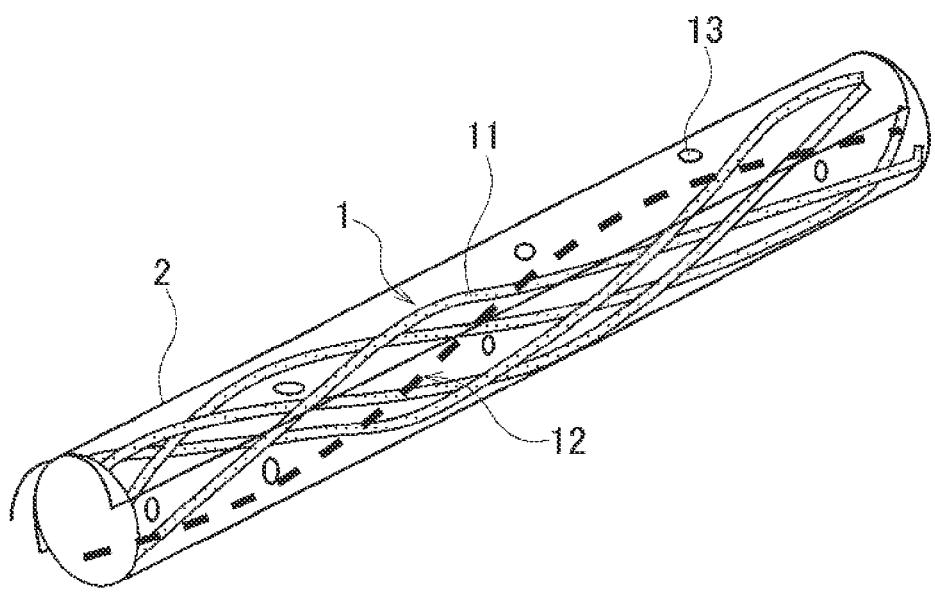
FIG. 2 is a perspective view showing a configuration of a strand core of the optical fiber cable according to the first embodiment of the present invention.

FIG. 2 is a perspective view showing a configuration of the strand core of the optical fiber cable according to the first embodiment of the present invention.

As shown in FIG. 2, the strand core 1 has a configuration in which the plural optical fiber strands 11 and the plural watertight material strings 12 are twisted together. The watertight material strings 12 are obtained, for example, in a manner such that fiber bundles including acrylate series fibers and polyester fibers are bundled with polyester filament strings. Once the watertight material strings 12 having water absorbability absorb water, the watertight material strings 12 are solidified or swollen. Further, while absorbing water, the watertight material strings 12 are dissolved in the water, and solidified or swollen while flowing together with the water. The strand core 1 is covered with the tape body 2.

The tape body 2 may be a plastic tape. The tape body 2 is used to ensure mechanical characteristics of the optical fiber cable. The tape body 2 covers the strand core 1 inside the slot groove 3. The tape body 2 has water permeability. In particular, the watertight material strings 12 are dissolved in water when the water permeates through the tape body 2, and the dissolved watertight material passes through the tape body 2 and flows into a sheath 5, that is, between the tape body 2 and the inner portion of the slot groove 3.

The slot core 4 is a holding member, as shown in FIG. 1, storing and holding the strand core 1 covered with the tape body 2 in the slot groove 3. The slot core 4 has a peripheral portion formed into a substantially cylindrical shape. The slot groove 3 is formed into a cylindrical shape and has a center line offset from the center line of the slot core 4.

The slot core 4 is formed by extrusion molding in a manner such that resin is poured into a metal mold and formed into a C-shape in cross section vertical to the longitudinal direction. The slot core 4 has an uneven thickness which is gradually thicker from the portion where the opening of the slot groove 3 is formed towards the opposite side of the opening along the circumference of the slot core 4. In other words, the slot core 4 has a thickness which is gradually thinner from the portion corresponding to the bottom portion of the slot groove 3 towards the portion where the opening of the slot groove 3 is formed.

The optical fiber cable further includes the sheath 5 having a cylindrical shape entirely covering the slot core 4 including the opening of the slot groove 3. The sheath 5 is formed into a cylindrical tube. The sheath 5 is formed by extrusion molding in a manner such that the slot core 4 housing the strand core 1 is entirely covered with polyethylene resin. Here, at the time of molding of the sheath 5, the opening of the slot groove 3 may be sealed with a holding tape so as to prevent the polyethylene resin for sheath from entering the slot groove 3.

The sheath 5 obtained as described above has a thickness which is thickest at the portion facing the opening of the slot groove 3 (on the upper side in FIG. 1), gradually decreases towards the bottom along the circumference of the slot core 4, and is thinnest at the bottom portion in contact with the bottom of the slot core 4.

Figure 3:
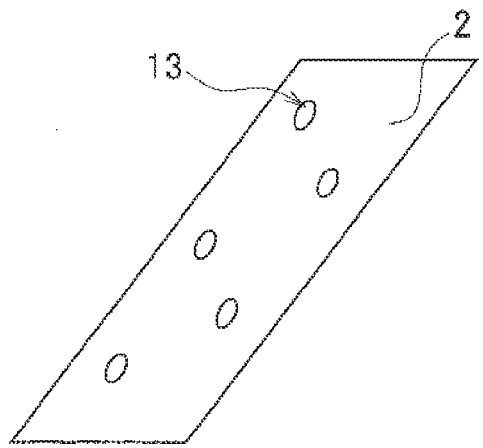
FIG. 3 is a perspective view showing a configuration of a tape body of the optical fiber cable according to the first embodiment of the present invention.
Figure 3:
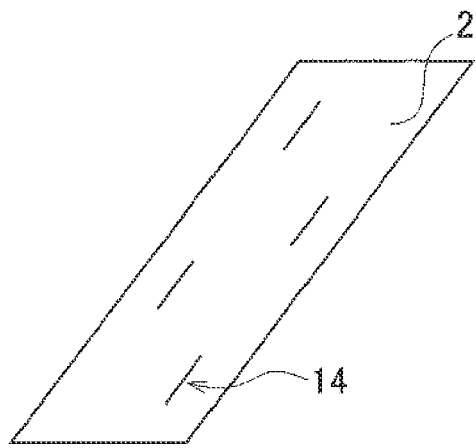

FIG. 3 is a perspective view showing a configuration of the tape body of the optical fiber cable according to the first embodiment of the present invention.

The water permeability of the tape body 2 can be ensured due to the formation of a plurality of openings on the tape body 2, as shown in FIG. 3. The openings may be permeation holes 13 as shown in FIG. 3(a) or may be slits 14 as shown in FIG. 3(b).

Second Embodiment

Figure 4:
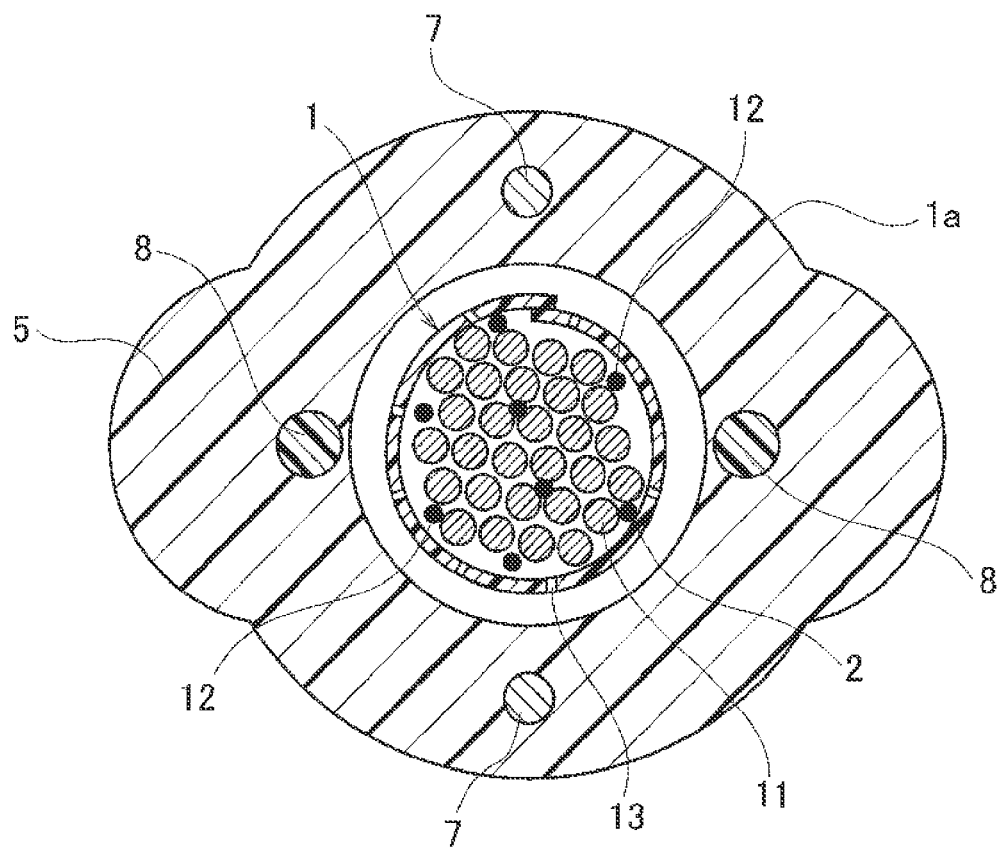
FIG. 4 is a cross-sectional view showing a configuration of an optical fiber cable according to a second embodiment of the present invention.

FIG. 4 is a cross-sectional view showing a configuration of an optical fiber cable according to a second embodiment of the present invention.

The optical fiber cable according to the second embodiment of the present invention may have a configuration not including the slot core 4, as shown in FIG. 4. In this optical fiber cable, the strand core 1 is covered with the outer cover (the sheath) 5 made of a synthetic resin material.

The strand core 1 has a configuration in which the plural optical fiber strands 11 and the plural watertight material strings 12 are twisted together. The watertight material strings 12 have water absorbability, as in the case of the first embodiment described above. Once absorbing water, the watertight material strings 12 are solidified or swollen. Further, the watertight material strings 12 after absorbing water are dissolved in the water, and solidified or swollen while flowing together with the water. The strand core 1 is covered with the tape body 2.

The tape body 2 may be a plastic tape. The tape body 2 has water permeability. In particular, the watertight material strings 12 are dissolved in water when the water permeates through the tape body 2, and the dissolved watertight material passes through the tape body 2 and flows into the sheath 5.

The outer cover 5 is made of a thermoplastic synthetic resin material. The outer cover 5 includes two tension members 7, 7 made of metal wires or the like located at opposed positions interposing the strand core 1 therebetween. The tension members 7, 7 are arranged in parallel with the strand core 1.

The outer cover 5 includes a pair of rip cords 8, 8 arranged in parallel on both sides opposed to each other interposing the optical fiber ribbon 1 therebetween. The outer cover 5 can easily be split in such a manner as to separate the rip cords 8, 8 towards both sides. The outer cover 5 is split at a terminal portion to carry out called a leading process to expose a terminal portion of the strand core 1 to the outside so as to be connected to an optical fiber ribbon of another optical fiber cable.

Third Embodiment

The water permeability of the tape body 2 may also be ensured in a manner such that the tape body 2 is made of a porous material.

Fourth Embodiment

The water permeability of the tape body 2 may also be ensured in a manner such that the circumference of the strand core 1 is not entirely covered with the tape body 2, but part of the circumference of the strand core 1 is exposed to the outside.

EXAMPLES

Example 1

As Example 1 of the present invention, an optical fiber cable was prepared having a configuration explained in the first embodiment and further having a configuration in which the outer diameter of the strand core 1 was set to approximately 5 mm. The tape body 2 having water permeability was obtained in a manner such that the permeation holes 13 having a diameter of approximately 1 mm were formed thereon at intervals of 50 mm.

As a comparative example, an optical fiber cable having the same configuration but using the tape body 2 without water permeability was prepared.

Figure 5:
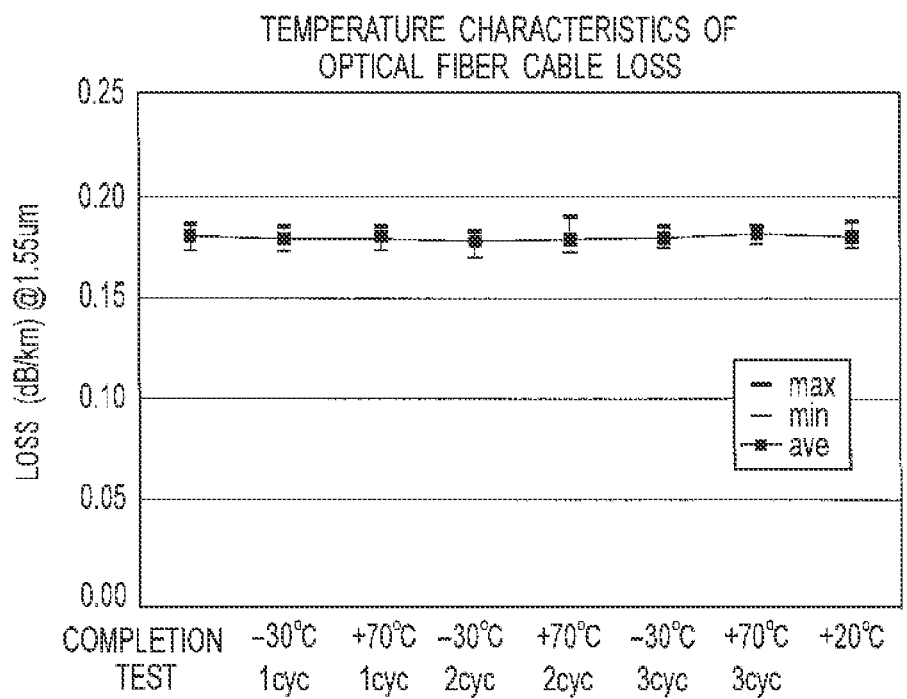
FIG. 5 is a graph showing a transmission loss amount of optical fibers in an optical fiber cable according to Example 1 of the present invention.

FIG. 5 is a graph showing a transmission loss amount of optical fibers in the optical fiber cable according to Example 1 of the present invention.

As shown in FIG. 5, the optical fiber cable according to Example 1 had good results of temperature characteristics with regard to transmission loss.

Figure 6:
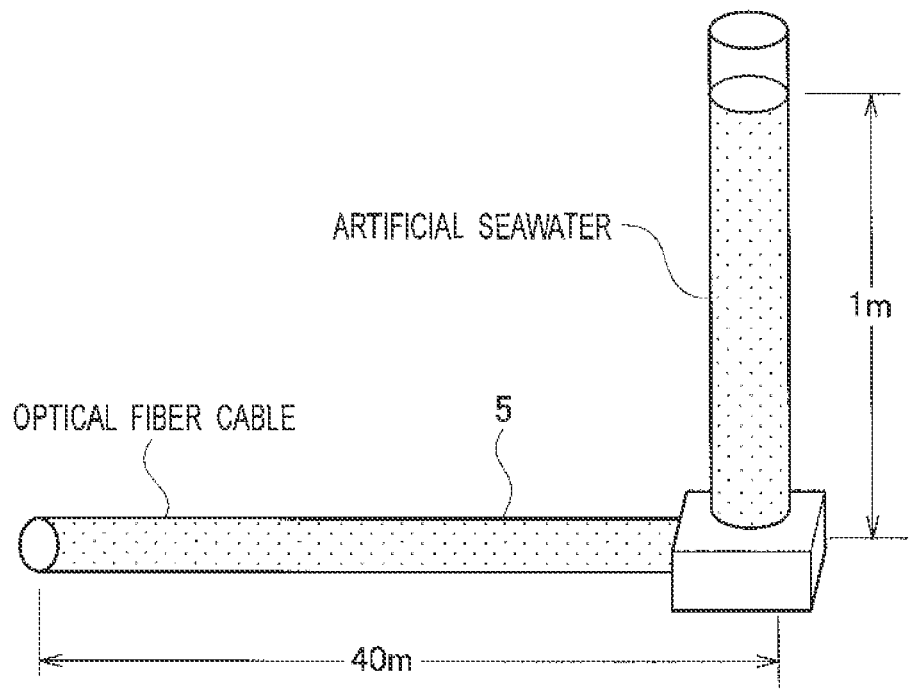
FIG. 6 is a perspective view showing a method of measuring a watertight property of an optical fiber cable.
Figure 7:
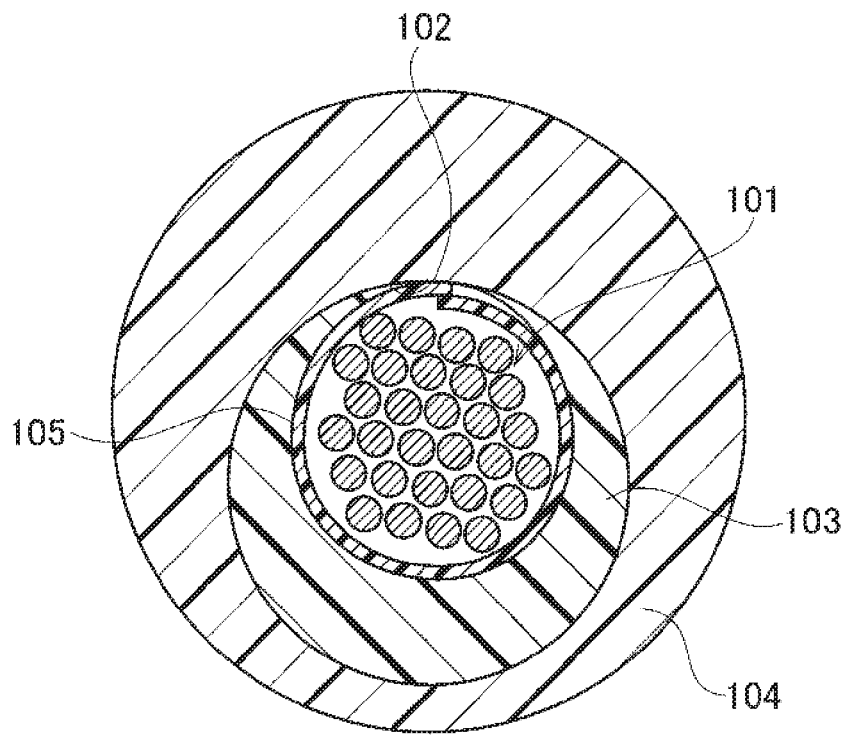
FIG. 7 is a cross-sectional view showing a configuration of a conventional optical fiber cable.

FIG. 6 is a perspective view showing a method of measuring the watertight property of the optical fiber cable.

The watertight property of the optical fiber cable of each of Example 1 and the comparative example was measured. Here, as shown in FIG. 6, the measurement is carried out in such a manner as to use each optical fiber cable, as a test sample, in which cross sections of components in the sheath 5 of which both ends are cut off face outward, and pour water into the sheath 5 from one end of the optical fiber cable so as to determine whether the poured water flows through the sheath 5 and reaches the other end of the optical fiber cable.

The length of the optical fiber cable of each test sample is set to 40 m. The water injection into the sheath 5 is carried out in such a manner as to use artificial seawater and constantly apply pressure of water with a depth of 1 m to one end of the optical fiber cable. In particular, a container including a column of artificial seawater having a depth of 1 m is placed on one end of the optical fiber cable, and the artificial seawater is added to the container to constantly keep the one-meter depth when the level of the column decreases due to water permeation into the sheath 5 or water evaporation. In this state, if the artificial seawater does not flow out of the other end of the optical fiber cable after 10 days, the optical fiber cable is thus defined as an accepted product, and if the artificial seawater flows out of the other end of the optical fiber cable before 10 days, the optical fiber cable is thus defined as a rejected product. Table 1 shows the measurement results of the watertight property.

TABLE 1

Measurement Results of Watertight Property

| Sample | Measurement results of watertight property |
| --- | --- |
| Tape body with openings (Example) | ○ |
| Tape body with no opening (Comparative example) | Flow of artificial seawater from 40 m cable end surface on fifth day |

The optical fiber cable of Example 1 resulted in an accepted product; on the other hand, the optical fiber cable of the comparative example resulted in a rejected product since the artificial seawater flowed out of the other end on the fifth day after the measurement was started.

With regard to the optical fiber cable of Example 1, it is considered that the watertight material was dissolved into the water present in the tape body 2, passed through the permeation holes 13 to flow between the tape body 2 and the slot groove 3 or between the slot core 4 and the sheath 5, and was then solidified or swollen so as to stop the water from flowing therethrough.

In the optical fiber cable of the comparative example, on the other hand, even though the watertight material was dissolved into the water in the tape body 2, the watertight material did not flow between the tape body 2 and the slot groove 3 or between the slot core 4 and the sheath 5 because there was no permeation hole 13 so that the water could not be stopped from flowing therethrough.

Example 2

As Example 2 of the present invention, an optical fiber cable was prepared having a configuration in which the outer diameter of the strand core 1 was set to approximately 5 mm. The tape body 2 having water permeability was obtained in a manner such that the slits 14 having a length of approximately 5 mm were formed thereon at intervals of 50 mm.

As a comparative example, an optical fiber cable having the same configuration but using the tape body 2 without water permeability was prepared.

The measurement in the same manner as Example 1 was performed on the optical fiber cable of Example 2, and the optical fiber cable had good results of temperature characteristics with regard to the transmission loss as in the case of Example 1. The optical fiber cable of Example 2 also resulted in an accepted product with regard to the watertight property. The optical fiber cable of the comparative example resulted in a rejected product.

With regard to the optical fiber cable of Example 2, it is considered that the watertight material was dissolved into the water in the tape body 2, passed through the slits 14 to flow between the tape body 2 and the slot groove 3 or between the slot core 4 and the sheath 5, and was then solidified or swollen so as to stop the water from flowing therethrough.

INDUSTRIAL APPLICABILITY

The present invention is applied to an optical fiber cable in which a strand core including optical fibers is housed in a sheath, and particularly, applied to an optical fiber cable having an improved watertight property.

What is claimed is:

1. An optical fiber cable comprising:
    a strand core including a plurality of optical fiber strands and watertight material strings;
    a tape body extending in a cable longitudinal direction and covering the strand core; and
    a cylindrical sheath covering the strand core and the tape body,
    wherein the tape body has water permeability, and
    the watertight material strings are configured to dissolve in water if the water permeates through the tape body, so that a dissolved watertight material passes through the tape body and flows into the sheath.

2. The optical fiber cable according to claim 1, wherein the water permeability of the tape body is ensured due to a plurality of openings formed on the tape body.

3. The optical fiber cable according to claim 1, wherein the water permeability of the tape body is ensured due to a porous material composing the tape body.

4. The optical fiber cable according to claim 1, wherein the water permeability of the tape body is ensured in a manner such that a circumference of the strand core is not entirely covered with the tape body, but part of the circumference of the strand core is exposed to an outside.

* * * * *